United States Patent [19]
Zinn et al.

[11] 3,930,204
[45] Dec. 30, 1975

[54] DEVICE AND CIRCUIT FOR DETECTING A PULSE SIGNAL IN NOISE IN REAL TIME

[75] Inventors: Mortimer H. Zinn, Elberon; George W. Taylor, Brielle; Kenton Garoff, Little Silver, all of N.J.

[73] Assignee: The United States of America as represented by the Secretary of the Army, Washington, D.C.

[22] Filed: Aug. 26, 1974

[21] Appl. No.: 500,963

[52] U.S. Cl. ................ 328/229; 307/311; 313/500; 315/169 R
[51] Int. Cl.² ........................................ H01J 31/58
[58] Field of Search ................ 315/169 R, 169 TV; 313/500, 483; 250/553; 328/227, 229, 231; 178/7.3 D, 7.2; 307/311

[56] References Cited
UNITED STATES PATENTS

| | | | |
|---|---|---|---|
| 2,928,975 | 3/1960 | Williams | 313/483 |
| 3,197,736 | 7/1965 | Leightner et al. | 307/311 X |
| 3,475,551 | 10/1969 | Green et al. | 315/169 R |
| 3,536,830 | 10/1970 | Hakki | 178/7.3 D |
| 3,830,972 | 8/1974 | Silverling et al. | 178/7.2 X |

*Primary Examiner*—John Kominski
*Attorney, Agent, or Firm*—Nathan Edelberg; Robert P. Gibson; Michael J. Zelenka

[57] ABSTRACT

A vacuum tube device is disclosed, together with a circuit for operation thereof, which is employed to detect a pulse signal in noise in real time. Two embodiments of a cathode structure for the device are disclosed as well as two embodiments of an anode structure.

11 Claims, 4 Drawing Figures

DEVICE AND CIRCUIT FOR DETECTING A PULSE SIGNAL IN NOISE IN REAL TIME

The invention described herein may be manufactured and used by or for the Government for governmental purposes without the payment of any royalties thereon or therefor.

FIELD OF THE INVENTION

This invention relates to devices and circuits for the detection of pulse signals and particularly to such devices and circuits for the detection of pulse signals in noise.

BACKGROUND OF THE INVENTION

It is often necessary to distinguish between a signal and noise which are received together. For example, radar returns often have noise levels which are substantial when compared with the expected signal. Therefore, it is necessary to find ways to distinguish between such signals and the accompanying noise.

Many systems employed to distinguish between a radar return and the noise associated therewith involve the integration of the received radar return over a number of expected returns of the signal so that the signal will tend to add to itself while the noise (being random) will average out. This method of distinguishing between a radar return and noise does work but cannot be achieved quickly since it is necessary for the operation thereof for a number of radar return intervals to occur before a decision can be made as to whether or not there is a radar return or noise present at a particular time.

A second method employed to distinguish a radar return from noise is to examine the signal level around an expected time of return and comparing the signal levels in adjacent time regions to determine whether one or the other regions have a signal level therein significantly different from the adjacent regions to indicate that a radar return, in fact, exists. This type of signal detection has been done primarily with chart recording devices long after the actual event has occurred.

Therefore, it is an object of this invention to provide a new and useful device and circuit for operation thereof for detecting a pulse signal in noise in real time.

It is another object of this invention to provide a device and circuit for operation thereof which can process a radar return prior to receipt of the next pulse in a repetitively pulsed system.

BRIEF DESCRIPTION OF THE INVENTION

With these and other objects in view, the present invention contemplates a device for distinguishing a signal in the presence of noise. The device includes a housing, a planar array of diodes mounted at a first location in the housing, a source of electrons mounted at a second location in the housing, apparatus mounted in the housing for accelerating electrons from the source towards the planar array, apparatus for sequentially directing the accelerated electrons to preselected portions of the planar array and apparatus mounted on the housing for modulating the amplitude of the accelerated electrons.

In one embodiment the planar array of diodes include a sheet of single crystal silicon having first and second sides sufficiently pure to function as N= material, an array of shallow isolated P+ regions on the first side to form the array of diodes, a thin layer of aluminum overlaying the P+ regions to provide ohmic contacts and an ohmic contact connected to the second side. The device also includes a summing amplifier, leads for connecting each of the diodes in the array to the summing amplifier and a threshold device for providing a signal when the output of the summing amplifier exceeds a predetermined level.

In a second embodiment, the planar array of diodes includes a plurality of diodes, an insulating substrate for holding the plurality of diodes in the array and a transmission line for electrically connecting each of the plurality of diodes to each other.

In a further embodiment, the source of electrons includes an array of selectively energizable electron-emitting devices and the apparatus for selectively directing the accelerated electrons includes apparatus for sequentially selectively energizing the array of electron-emitting devices.

DESCRIPTION OF THE DRAWINGS

For a more complete understanding of the invention, references should be had to the following detailed description and drawings in which.

DETAILED DESCRIPTION OF THE INVENTION

Figure 1:
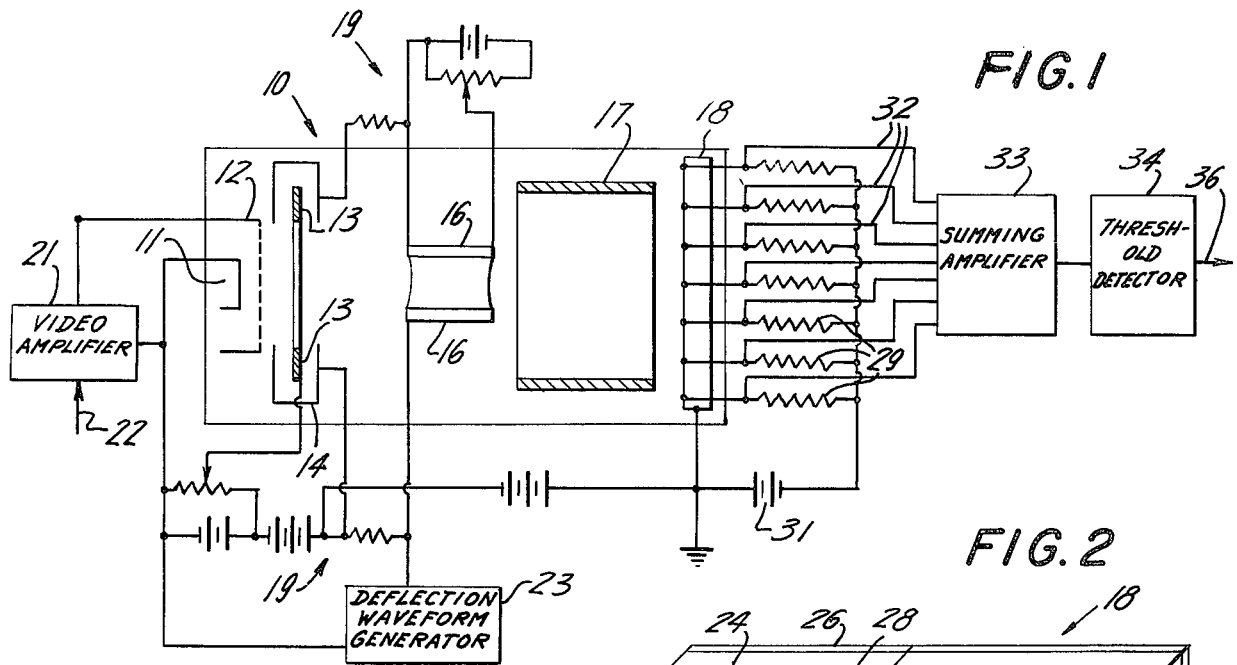
FIG. 1 is schematic showing of a vacuum tube device embodying the principles of this invention and a schematic and block diagram view of a circuit for operating the same.

Referring now to FIG. 1, we see a vacuum tube
Referring now to FIG. 1, we see a vacuum tube device 10 which in a first embodiment includes a conventional planar cathode 11 heated by a heater (not shown). A conventional mesh grid 12 is mounted adjacent to the cathode 11.

A pair of focusing electrodes 13 and 14 are mounted to the right of the grid 12. The electrodes 13 and 14 serve as a lens to focus the beam of electrons so as to give optimum beam spot size at a target.

To the right of the focusing electrodes 13 and 14 is deflecting electrode 16. The deflecting electrode 16 shown is capable of providing deflection in the x and y direction from a common source. However, separate x and y deflection plates could serve equally well.

A post deflection acceleration electrode 17 made from a cylindrical conductor is mounted to the right of the deflection electrode 16.

It should be understood that the elements 11 through 17 thus described are conventional in many types of accelerated beam vacuum tubes and have, therefore, not been described in undue detail.

A target 18 is mounted in the tube 10 to the right of the acceleration electrode 17 to receive the electrons from the cathode 11 modulated by the grid 12 focused by the electrodes 13 and 14, deflected by the electrode 16 and accelerated by the electrode 17. A plurality of voltage sources and resistors 19 bias the various electrodes to the proper D.C. operating levels. A video amplifier 21 amplifies signals applied to an input lead 22 for modulating the voltage between the cathode 11 and the grid 12 to effect the intensity of the beam of electrons accelerated down the tube 10.

A deflection waveform generator 23 applies a deflection waveform to the deflecting electrode 16 to move the beam of electrons generated by the cathode 11 and modulated by the video amplifier 21 in a predetermined pattern across the target 18.

Figure 2:
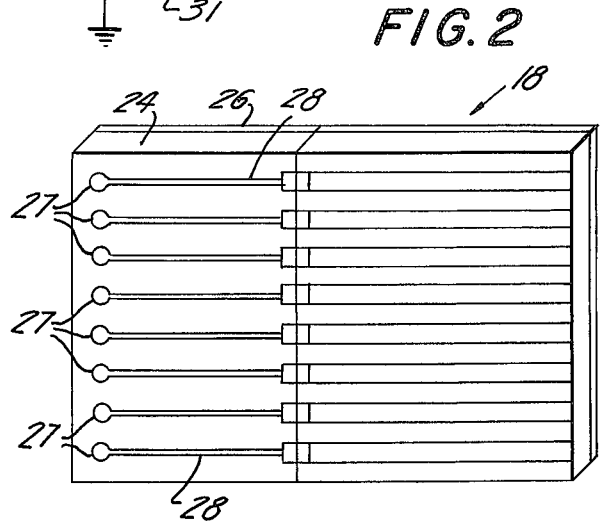
FIG. 2 is a perspective view of an anode employable in the vacuum tube shown in FIG. 1.

Referring now to FIG. 2, we see a view of the target 18 showing the details of the construction thereof. The main portion 24 of the target 18 is made from a piece of single crystal silicon which is of sufficient purity to be considered intrinsic or $N^-$ material. The back surface of the portion 24 is covered with a thin layer 26 of metal to serve as a common ground plane for the target 18. Along the lefthand side of the target 18, eight diodes 27 have been formed by doping the silicon to provide isolated $P^+$ regions providing shallow lying P-N junctions. Over each diode 27 is a thin layer of aluminum 28 which extends to the right, providing an ohmic contact from the diode across the face of the target 18. At the righthand portion of the target 18 the thickness of the aluminum 28 is increased to form strip transmission lines with the ground plane 26 to provide a predetermined capacitance across the diodes 27.

Referring again to FIG. 1 we see a plurality of resistors 29 each along one side connected to one of the conductors 28. The other side of each of the resistors 29 are connected to a voltage source 31 to provide a bias across each of the resistors 29 connected in series with one of the diodes 27. A plurality of leads 32 connect each of the conductors 28 to a summing amplifier 33. The output of the summing amplifier 33 is connected to a threshold detector 34.

In operation a signal (such as a received radar signal) is applied to the input 22 of the video amplifier 21 to modulate the beam of electrons in the tube 10 in accordance therewith. The deflection waveform generator moves the beam of electrons sequentially across the diodes 27 over a time period of interest. The capacitance offered by the wide portions of the conductors 28 ensure that signals resulting from the interaction of the electron beam and each diode 27 persists on the conductors 28 for a period of time equal to the time of deflection across the diodes 27. In this way, the amplitude of the electron beam, as it crosses each diode 27 and as it is multiplied in each of the diodes, is preserved for the time of the entire deflection.

The signals provided on the leads 28 are added in the summing amplifier 33 to provide a composite signal of the output thereof. If the signal on the output of the summing amplifier 33 exceeds a threshold level determined by the threshold detector 34, an output signal is provided on a lead 36 indicating that a pulse was present on the lead 22. If, on the other hand, the signal on the output of the summing amplifier 33 does not reach the threshold level, no signal is provided on the output lead 36.

Therefore, it is seen that the device described directly breaks the signal provided on the lead 22 into constituent time intervals determined by the deflection waveform generator 23 and diodes 27 hold the amplified signal of each constituent time interval and sums the same. The summing of the constituent signals enables a decision to be made based upon amplitude of the sum thereof or the average value of the sum to determine if the signal on the lead 22 was, in fact, a real signal or merely noise.

Figure 3:
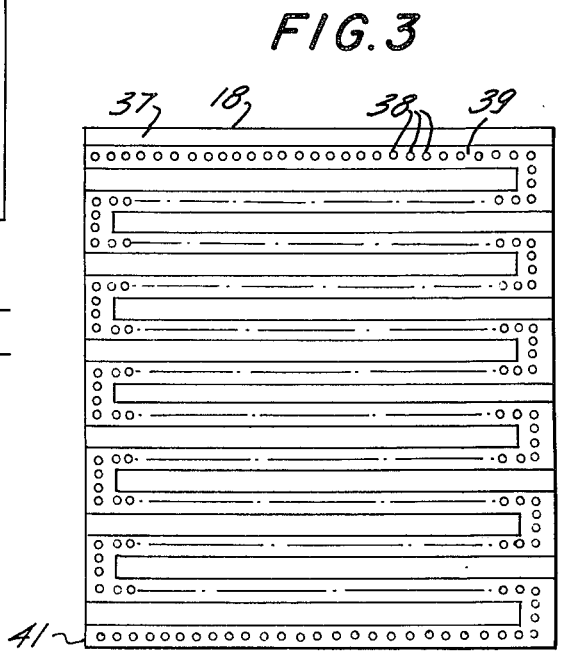
FIG. 3 is a front view of a second anode employable in the vacuum tube shown in FIG. 1.

Referring now to FIG. 3, we see an alternative embodiment of the target 18. In this embodiment, the target 18 includes an insulating substrate 37, a plurality of equally spaced diodes 38 and a conductor 39 overlaying the diodes 38. As with the target 18, shown in FIG. 2, the back of the substrate 37 is a conducting ground plane. The conductor 39 forms a transmission line with the ground plane having a predetermined signal transmission time. In operation, the beam of electrons is swept across the front of the target 18, along the pattern of the conductor 39. The rate of sweep is adjusted so that the beam moves from one diode 38 to the next at a rate equal to the signal transmission time. In this way, the signal generated by the interaction of the electron beam with a first diode 38 reaches the second diode 38 at the same time as the beam. In this way, signals from each diode are automatically added as they travel along the conductor 39.

As a result, the resistors 29 and summing amplifier 33 need not be employed but rather the signal appearing at an end point 41 can be fed directly into the threshold detector 34.

Figure 4:
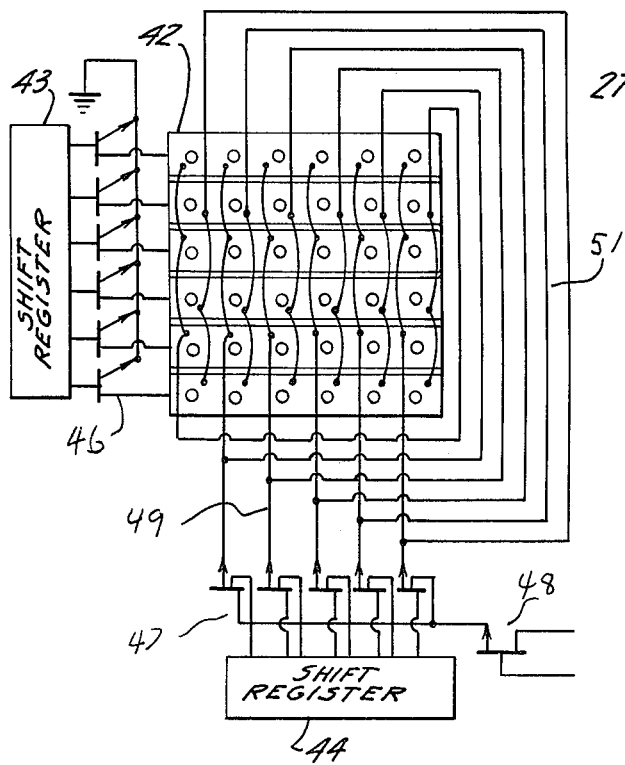
FIG. 4 is a front view of a cathode structure employable in the vacuum tube of FIG. 1 together with a block diagram showing of the circuitry for operation of the same.

Referring now to FIG. 4, we see an electron emitter array 42 which can be employed to provide a simplified form of the tube 10 shown in FIG. 1. With the electron emitting arrays shown in FIG. 4, the electrodes 11 through 17 can be eliminated. A set of shift registers 43 and 44 can be employed to actuate select portions of the array to emit electrons in a predetermined location. a plurality of transistors 46 having their emitters grounded and their bases connected to the shift register 43, are employed to energize particular rows of the array. A plurality of transistors 47 are employed to selectively energize particular sections of the array. Rather than selecting a complete column, leads 49 connect the emitters of the transistors 47 to elements in a column in the array in alternate rows while the lead 51 connects the same emitters to the remaining unconnected elements in the array in different columns. In this way the interaction of the shift registers 43 and 44 cause the electron beam to move along a row of elements in the array and then back along the next row. A transistor 48 is employed to provide voltage to the collectors of the transistors 47 in accordance with a video signal applied to the base thereof. In this way the amplitude of the electron beam is modulated, doing away with the need for a grid structure when such an array is employed. In this way either the target shown in FIG. 2 using a single line of cathode sources and a single shift register, or 3 using the structure shown in FIG. 4, can be scanned as desired. For a more complete disclosure of the electron emitting array 42, see U.S. Pat. No. 3,500,102 which is incorporated herein by reference.

While this invention has been described with respect to a particular embodiment thereof, numerous others will become obvious to those of ordinary skill in the art in light thereof.

What is claimed is:

1. A device for distinguishing a signal in the presence of noise, said device (including) comprising
   an evacuated housing;
   a planar array of diodes mounted at a first location in said housing;
   a source of electrons mounted at a second location in said housing;
   means mounted in said housing for accelerating electrons from said source towards said planar array;

means for sequentially directing said accelerated electrons to preselected portions of said planar array; (and)

means mounted on said housing for modulating the amplitude of said accelerated electrons;

a summing means connected to each of the diodes in said diode array for summing the output thereof; and a threshold means for providing a signal when the output of said summing means exceeds a predetermined level.;

2. The device, as defined in claim 1, in which said planar array of diodes include:

a sheet of single crystal silicon sufficiently pure to function as $N^-$ material; said sheet having a first side and a second side;

an array of shallow isolated $P^+$ regions on said first side to form said array of diodes;

a thin layer of aluminum overlaying said $P^+$ regions to provide ohmic contacts; and an ohmic contact connected to said second side.

3. The device as defined in claim 2 in which said accelerated electrons are sequentially directed to said preselected portions of said planar array over a first time interval; and said means for connecting each of said diodes to said summing device exhibits a capacitance sufficient to provide a time constant approximately equal to said first time interval.

4. The device as defined in claim 1 in which said planar array of diodes includes:

a plurality of diodes;

an insulating substrate for holding said plurality of diodes in said array; and means for electrically connecting each of said plurality of diodes to each other.

5. The device as defined in claim 4 in which said means for electrically connecting each of said plurality of diodes to each other is a part of a transmission line in which a signal will travel from a first of said diodes to a second of said diodes in a first time interval; and said means for sequentially directing said accelerated electrons to preselected portions of said planar array will direct said accelerated electrons from said first diode to said second diode in said first time interval.

6. The device as defined in claim 5 also including:

a threshold device having an input connected to said means for electrically connecting each of said plurality of diodes to each other for providing a signal when said input has a signal thereon above a predetermined amplitude.

7. The device as defined in claim 1 in which said source of electron includes an array of selectively energizable electron emitting devices and said means for selectively directing said accelerated electrons includes:

means for sequentially selectively energizing said array of electron emitting devices.

8. The device, as defined in claim 7, in which said planar array of diodes include:

a sheet of single crystal silicon sufficiently pure to function as $N^-$ material; said sheet having a first side and a second side;

an array of shallow isolated $P^+$ regions on said first side to form said array of diodes;

a thin layer of aluminum overlaying said $P^+$ regions to provide ohmic contacts; and an ohmic contact connected to said second side.

9. The device as defined in claim 8 in which said accelerated electrons are sequentially directed to said preselected portions of said planar array over a first time interval; and said means for connecting each of said diodes to said summing device exhibits a capacitance sufficient to provide a time constant approximately equal to said first time interval.

10. The device as defined in claim 7 in which said planar array of diodes includes:

a plurality of diodes;

an insulating substance for holding said plurality of diodes in said array; and means for electrically connecting each of said plurality of diodes to each other.

11. The device as defined in claim 10 in which said means for electrically connecting each of said plurality of diodes to each other is a part of a transmission line in which a signal will travel from a first of said diodes to a second of said diodes in a first time interval; and said means for sequentially directing said accelerated electrons to preselected portions of said planar array will direct said accelerated electrons from said first diode to said second diode in said first time interval.

* * * * *